(12) United States Patent
Hendry et al.

(10) Patent No.: US 6,267,448 B1
(45) Date of Patent: Jul. 31, 2001

(54) INFLATABLE BAG ASSEMBLY FOR LIFTING A LOAD

(75) Inventors: James R. Hendry, Oneida, NY (US); John Kowalski, Pittsburgh, PA (US); Fred P. Smith, Alpine; Tim E. Grosland, Pleasant Grove, both of UT (US)

(73) Assignee: Load Hog Industries, Inc., Aliquippa, PA (US)

( * ) Notice: Subject to any disclaimer, the term of this patent is extended or adjusted under 35 U.S.C. 154(b) by 0 days.

(21) Appl. No.: 09/374,547

(22) Filed: Aug. 13, 1999

Related U.S. Application Data

(62) Division of application No. 09/061,315, filed on Apr. 16, 1998, now Pat. No. 5,975,643.

(51) Int. Cl.$^7$ ........................................................ B60P 1/16
(52) U.S. Cl. ................................................................ 298/22 R
(58) Field of Search ................................. 298/22 R, 19 V, 298/21 R, 22 F, 21 V; 254/93 R, 93 HP

(56) References Cited

U.S. PATENT DOCUMENTS

| | | |
|---|---|---|
| 3,659,899 | 5/1972 | Phillips et al. . |
| 3,711,157 | 1/1973 | Smock . |
| 3,784,255 | 1/1974 | Smock . |
| 4,066,296 | 1/1978 | Ray, Jr. et al. . |
| 4,168,861 | 9/1979 | Carroll . |
| 4,572,579 | 2/1986 | Saito . |
| 5,067,774 | 11/1991 | Trowland . |
| 5,513,901 | 5/1996 | Smith et al. . |
| 5,560,684 | 10/1996 | Gilmore . |
| 5,669,106 | 9/1997 | Daoud . |
| 5,704,095 | 1/1998 | Guenschel . |
| 5,975,643 | * 11/1999 | Smith et al. ........................ 298/22 R |

FOREIGN PATENT DOCUMENTS

| | | |
|---|---|---|
| 1207221 | 12/1965 | (DE) . |
| 931701 | 6/1982 | (SU) . |
| 1606363A | 11/1990 | (SU) . |
| WO94/06649 | 3/1994 | (WO) . |

* cited by examiner

Primary Examiner—Stephen T. Gordon
(74) Attorney, Agent, or Firm—Thorp Reed & Armstrong, LLP

(57) ABSTRACT

A bag actuated tilting device where the area of cross section of the bag is sized such that available pressure multiplied by the bag cross sectional area multiplied by the distance from the pivot perpendicular to a line drawn from the center of the bag base to the center of the cross section equals the load that is being lifted multiplied by the distance from the pivot perpendicular to the line of action of the load. The bag is designed so that the cross sectional area of the bag increases from the top of the bag, mounted to the load, to its base, whereby as the bag collapses, the top of the bag moves downwardly toward its base, folding inwardly onto itself without buckling. In addition, the present invention provides for securely mounting the bag at both ends to the thrust plates nearest to the hinge that causes the bag to effectively become a fixed end-fixed end column resulting in reduced potential for buckling. In addition, the present invention provides a separate electrically run centrifugal pump for efficiently operating the inflatable bag assembly, whereby a check valve maintains gas pressure when the pump is turned off, and allows the bag to be inflated and maintained at an intermediate position.

3 Claims, 9 Drawing Sheets

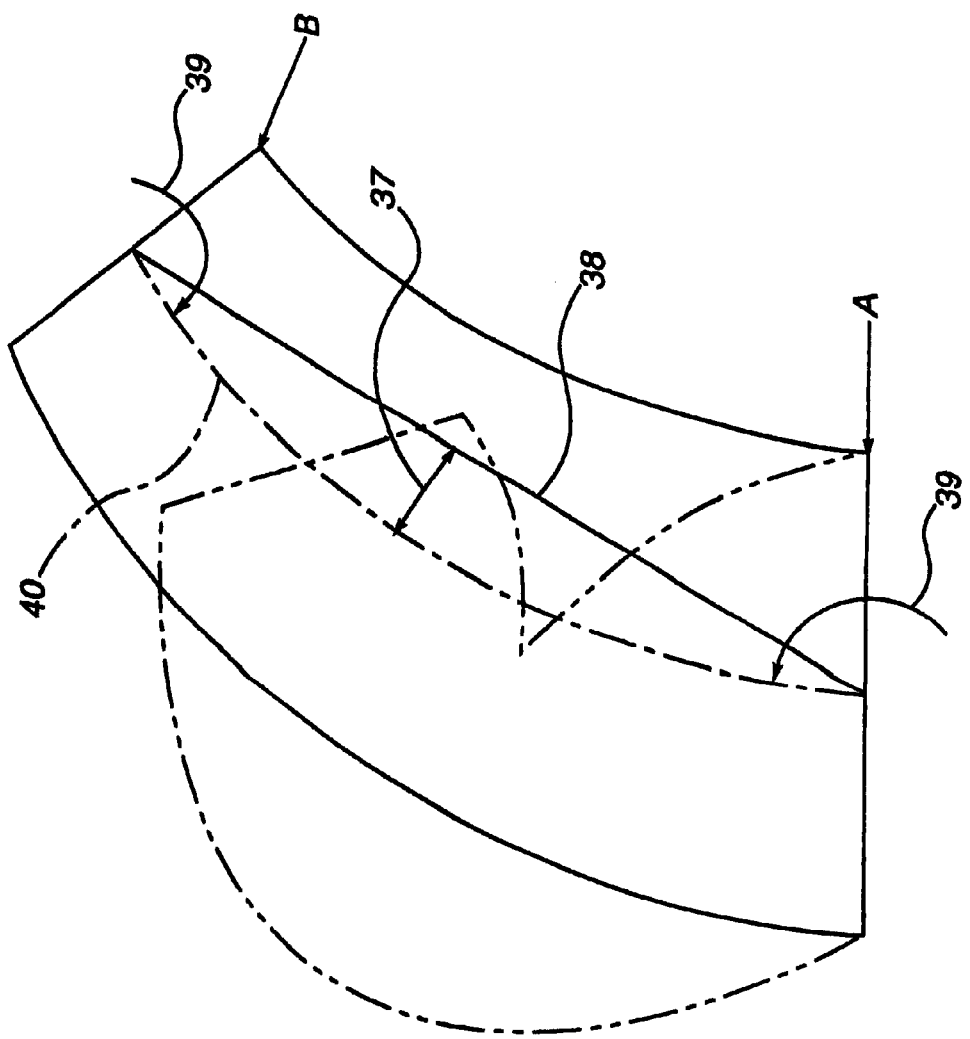

INFLATABLE BAG ASSEMBLY FOR LIFTING A LOAD

RELATED APPLICATION

This application is a divisional of Ser. No. 09/061,315, filed Apr. 16, 1998 now U.S. Pat. No. 5,975,643.

FIELD OF THE INVENTION

This invention relates to the bag for bag actuated tilting devices. Particularly this invention relates to a lifting bag where the cross section of the bag is sized such that the pressure in the bag is substantially constant throughout the tilting or lifting cycle. More particularly, the bag is used to rotate a bed (such as a dump truck) about a pivot point, making the most efficient use of available energy.

BACKGROUND OF THE INVENTION

Lifting devices have been used for many years to conveniently dump a load from a vehicle. The lifting devices are generally mounted between the truck bed and chassis to convert a pickup truck into a small dump truck. Activation of the lifting device tilts the truck bed about a pivot point thereby dumping the contents of the truck bed at a desired location. There are many instances where a small dump truck or dump trailer is desirable. For example, when performing routine maintenance and other projects, municipalities frequently require relatively small amounts of sand, gravel or asphalt to be delivered to a site. Also, landscapers, gardeners, and home owners have use for a dumping vehicle for lawn care and other home repair projects. A dual pickup/dump truck reduces costs and increases efficiency by allowing multiple uses of trucks already being used for other purposes.

All lifting assemblies require the application of force to lift a load. Such force may be applied by supplying an incompressible fluid (air, hydraulic fluid, etc.) under pressure to an expandable device positioned between the load an vehicle chassis. For an efficient system, it would be desirable to utilize all the pressure available to lift the load throughout the entire lift cycle.

To dump a load, the tilting mechanism must rotate and lift the bed about an axis approximately 45–50° from horizontal to allow the material contained therein to flow by gravity from the bed. The weight of the load ($W_{load}$), acting downwardly at its centroid, multiplied by the perpendicular distance between the force and the bed pivot ($D_{load}$) gives the load moment ($M_{load}$) necessary to raise the bed. Written as an equation: $M_{load}=W_{load} \times D_{load}$. The lifting moment ($M_{lift}$) is the force of the lifting component attached to the bed ($F_{lift}$) multiplied by the perpendicular distance from the pivot to the line of force of the lifting component ($D_{lift}$). Written as an equation: $M_{lift}=F_{lift} \times D_{lift}$. It is desirable to have the maximum available lifting moment ($M_{lift}$) equal the load moment ($M_{load}$).

Generally, there are two types of lifting assembles: inflatable lifting bags and hydraulic operated dumping mechanisms. Hydraulically driven lifting assemblies provide a significant amount of force to dump pickup beds. In general, however, installation of this equipment is cumbersome, difficult, and expensive. Furthermore, installation of hydraulic cylinder dumping assemblies requires tools not generally available to the homeowner, resulting in decreased sales due to increased costs and shipping difficulties. These types of tilting mechanisms, generally, require raising the truck bed vertically several inches to provide room for mounting the tilting apparatus. Raising the truck bed, however, causes misalignment of the lines and pin-striping between the cab and bed thereby reducing the aesthetic qualities of the vehicle. As the overall appearance of the truck is very important to the consumer, many owners of pickup trucks are unlikely to buy and install hydraulic lift equipment.

There are several mechanical disadvantages associated with the aesthetic and cost concerns of hydraulically driven lift assemblies described above. Hydraulic cylinder actuated devices are inherently inefficient as it is difficult to match the load moment to the lifting moment because the hydraulic cylinder must maintain the same cross section. The load moment is set by the weight and geometry. The only variables in the lift moment are the lift force, which is constant for a specified cylinder pressure, and the distance ($D_{lift}$) from the line of action of the force to the pivot. As disclosed in U.S. Pat. No. 5,513,901, some advancements have been made in the prior art with various types of cams and linkages to vary the distance such that the lifting moment will more closely match the load moment. However, this arrangement requires complex and expensive mechanisms that will not mount in the limited space available under the truck bed necessary to maintain the vehicle's aesthetic integrity. Furthermore, hydraulic lifting devices require the use of a hydraulic fluid, that can cause harm to the environment if leaked or spilled.

In addition to hydraulic lift assemblies, various inflatable bag assemblies have been employed to more effectively and efficiently lift and tilt truck beds. Some of these prior art vices are disclosed in U.S. Pat. Nos. 3,659,899 to Phillips et. al, 3,711,157 to Smock, 3,784,255 to Smock, 5,067,774 to Trowland, and 5,560,684 to Gilmore.

For example, U.S. Pat. No. 5,067,774 to Trowland discloses a truncated cone shaped bag that allows the bag to deflate in a more controlled manner. The Trowland bag, however, is not optimized to use constant pressure during the lifting cycle, or to fold along the path of travel of the upper thrust plate, thereby resulting in a less effective and less efficient lifting assembly. Another prior art bag lifting assembly is disclosed in U.S. Pat. No. 5,560,684 to Gilmore. The patent to Gilmore discloses a two-stage lifting assembly. The first stage includes walls that extend substantially at right angles to the chassis for tilt angles of 0° to 20°, while the second stage bag is a truncated right cone, similar to the entire bag design in the patent to Trowland. As stated in Gilmore, the purpose of the two stage bag arrangement is to provide thrust at generally right angles to the tipping tray irrespective of the tipping angle. However, several disadvantages are apparent in the patent to Gilmore that limit its effectiveness. First, although it might be considered an advancement, in some ways, over the lifting assembly in Trowland, the lifting bag in Gilmore is not optimized for the available pressure. In addition, like the patent to Trowland, the bag disclosed in the patent to Gilmore is not optimized to fold along the path of travel of the upper thrust plate. Also, the bag disclosed in the Gilmore patent will tend to buckle from an eccentric loading on the knee portion between the two bag stages.

Furthermore, many of the prior art lifting bag assemblies utilize exhaust gases from the engine to activate the bag. One of the many disadvantages of this arrangement includes the voiding of most manufacturers' engine warranties due to back pressure from the exhaust. In addition, heat from the exhaust gas is detrimental to the elastomer in the bag, and thereby requires a complex and expensive cooling system to cool the gas before entering the bag. In addition, the use of exhaust powered bags requires the addition of a diverter valve to divert the exhaust into the bag along with a separate bypass valve to bypass the exhaust gas from the bag to avoid engine stalling. Generally, this arrangement results in an inefficient and leaky system that requires the engine not only to be running to initially raise the load, but to also maintain the load in its raised position. The exhaust powered system also makes it virtually impossible to stop the lift at a midcycle position. Furthermore, the usable pressure of the exhaust powered system is limited by the back pressure that the engine will allow without stalling.

In addition to that described above, the inflatable bag lifting assemblies of the prior art all have the disadvantage of providing an inflatable bag that allows for rotation with respect to both the top and bottom thrust plates, thereby increasing the tendency of the bag to buckle during inflation and deflation. Furthermore, because the prior art bag is allowed to rotate during inflation and deflation, the air inlet to the bag necessarily moves with the bag as the bag rotates on the thrust plate. Accordingly, it is difficult to firmly secure or tie down all of the inlet equipment and connecting attachments, including the hose, while also providing flexibility in the connections to accommodate the movement of the bag during activation and deactivation.

Although some advancement has been made in the prior art to more effectively lift a load, the prior art lifting assemblies still have a number of drawbacks, such as effectively collapsing or folding into an acceptable length, width, or height so that the aesthetic appearance of the truck is preserved. Accordingly, even small advancements made in the prior art to more efficiently lift a load or reduce the mounting height of the truck bed have been considered significant in the production of lifting assemblies. As a result, to manufacture a lifting assembly desirable to the consumer, it is essential to fully utilize lifting pressure to lift the greatest load, minimize the bulk of the bag, and stabilize the bag upon inflation and deflation.

SUMMARY OF THE INVENTION

The present invention solves one or more of the above-referenced problems of the prior art by making optimal use of the pressure available. The area of the cross section of the bag, at a particular degree of lift, is calculated by taking the load moment divided by the bag pressure and the perpendicular distance from the bed hinge to a line from the center of the bottom of the bag to the center of the top of the bag at that degree of lift. In so doing, the maximum available pressure is used to lift a load throughout the entire lift cycle. At larger degrees of rotation, the eccentricity of the bag column will cause the bag to buckle, however, the inflatable bag of the present invention is further optimized such that each cross section of the bag is moved toward the center of rotation, thereby reducing the eccentricity of the column. Through finite element analysis, the bag is modeled and the cross sections moved toward the bed pivot until the compression of the bag at the small section is larger than at the buckling point. Because the move in the cross sections of the bag reduces the moment arm of the bag about the pivot, the cross sectional area of each section is increased such that $M_{lift}$ again equals $M_{load}$. The centers of the cross sections still form a curve that nearly matches the radius around the bed pivot so the bag will collapse in an accordion-like manner, starting from the smallest end and progressing outwardly. The cross sections of the bag may also be further adjusted so that when viewed from the side, with the bag fully inflated, the points of each cross section of the bag closest to the hinge form a straight line. Again, the area of the cross sections would be adjusted such that $Ma_{lift}$ still equals $M_{load}$. As a result, the bag of the present invention is designed to collapse closest to the arc of travel and not buckle, while also utilizing all of the pressure available at each degree of rotation.

The present invention also provides a method of attachment and a means by which the bag can be reduced to a relatively small volume in the collapsed state by folding in an accordion-like manner, such that the bag collapses primarily within the footprint of its base. Accordingly, securely mounting the bag at both ends to the thrust plates nearest to the hinge causes the bag to effectively become a fixed end-fixed end column resulting in reduced potential for buckling. In addition, the bag is designed so that one end of the bag is smaller than the other end. When the pressure is reduced to lower the bed, the entire bag is subjected to a compressive force that acts along a line between where the bag is attached to the upper thrust plate and where the bag is attached to the lower thrust plate. The part of the bag with the smallest area will collapse first, with compression progressing downwardly toward the base of the bag until the bag is completely collapsed.

Intimately related to that described above, another aspect of the invention is the general elliptical cross section of the bag. The design described above allows for the reduction in the overall height and width of the bag thereby allowing the bag to fit between and more easily clear obstructions in the chassis, in both an inflated and collapsed position. Since the longitudinal axis of the ellipse is in the buckling plane, the tendency of the bag to buckle is also reduced.

In addition, the present invention provides a separate electrically run centrifugal pump for efficiently operating the inflatable bag assembly. Gas is pumped through a check valve into the bag so that when the pump is turned off, the bag will retain its gas pressure. In addition, a solenoid valve is teed in between the bag and the check valve to deflate the bag. The check valve also allows the bag to be inflated and maintained at an intermediate position. This method also allows for higher bag pressures which also makes the bag smaller in its cross sectional area, which in turn allows the bag to fold into a smaller volume. Those and other advantages and benefits of the present invention will become apparent from the Detailed Description of A Preferred Embodiment herebelow.

BRIEF DESCRIPTION OF THE DRAWINGS

The invention shall be described with reference to a preferred embodiment illustrated in the following drawings.

FIG. 5 is a side view of a bag of the present invention, with a buckled bag shown in phantom lines.

DETAILED DESCRIPTION OF A PREFERRED EMBODIMENT

Figure 1:
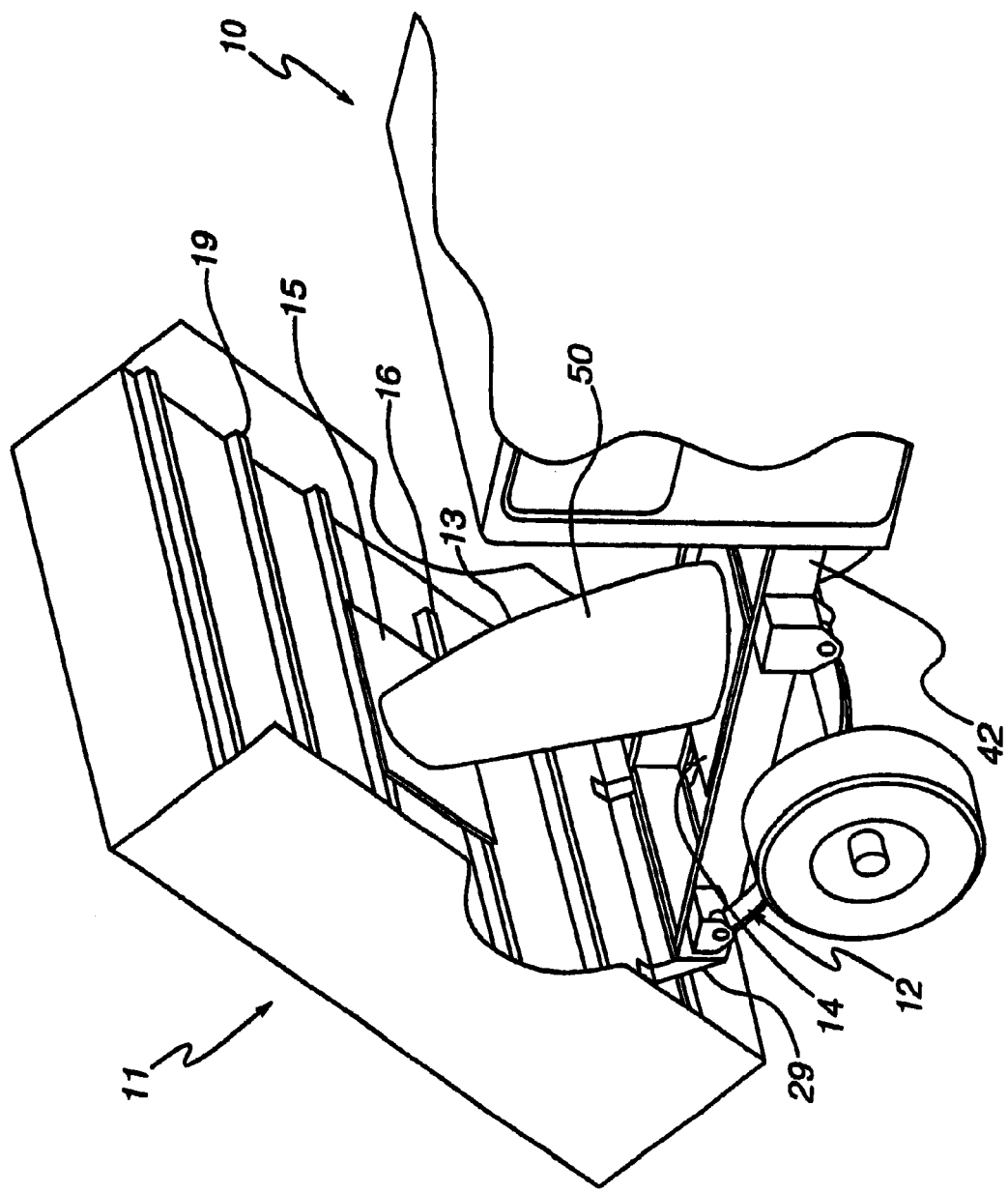
FIG. 1 is a perspective view of the inflatable lifting bag of the present invention mounted to a dumping vehicle.
Figure 2:
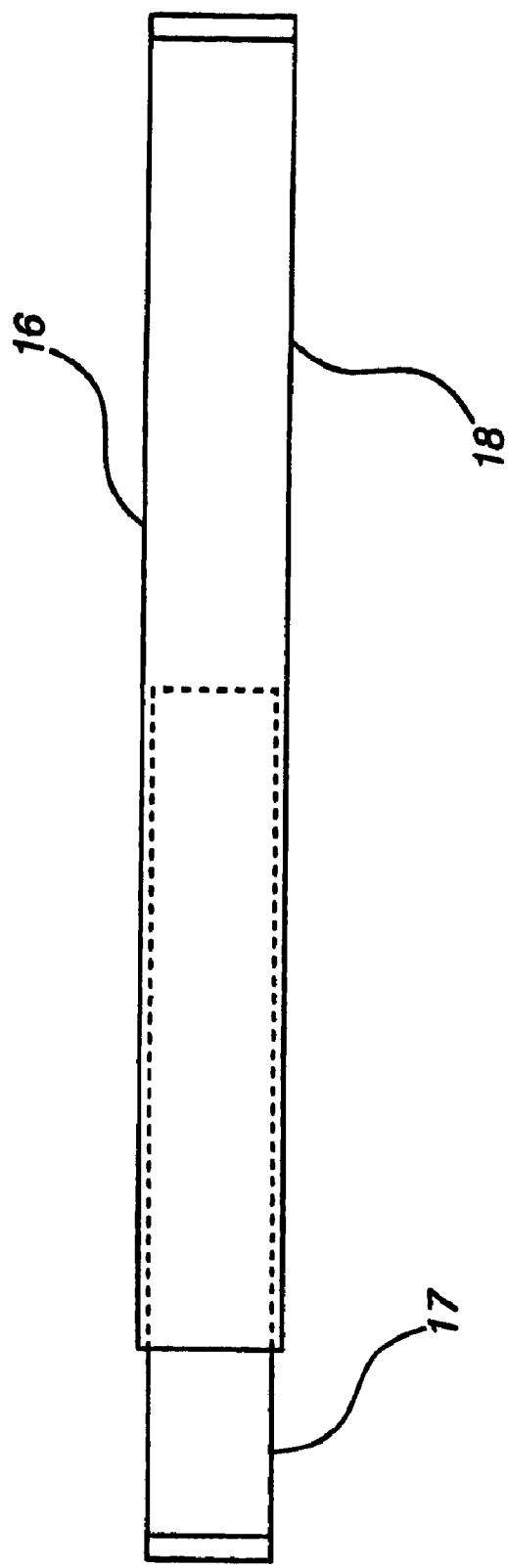
FIG. 2 is a side view of a strut for mounting the bag of the present invention to a chassis.

Referring now to FIG. 1, there is illustrated, generally, a vehicle 10 with a bed 11 hingedly attached to the vehicle chassis 12. A gas actuated bag 13 is positioned between the chassis 12 and the bed 11. The bag 13 is mounted to a lower thrust plate 14 and an upper thrust plate 15 via a bottom portion 22 and a top portion 33 (FIG. 3), respectively. An intermediate portion 50 connects the bottom portion 22 to the top portion 33, thereby forming the bag 13. The thrust plates 14, 15 are conventional support plates preferably constructed of a durable material, such as wood, fiberglass, or other sheet material capable of supporting the force of the inflating bag 13. The lower thrust plate 14 is mounted to cross members 16 that are fixedly attached transversely to the chassis 12. As shown in FIG. 2, the cross members 16 are composed of two pieces, an inner tube 17 that is slidably inserted into an outer tube 18. This arrangement allows the cross member 16 to be adjusted to different vehicle chassis 12 widths. It also allows for ease of installation in that the cross member 16 can be adjusted for placement between the flanges of the chassis 12 and then extended to the web of the chassis and affixed thereto. The upper thrust plate 15 is secured to the bed cross members 19 in a similar manner as the lower thrust plate assembly.

Figure 3:
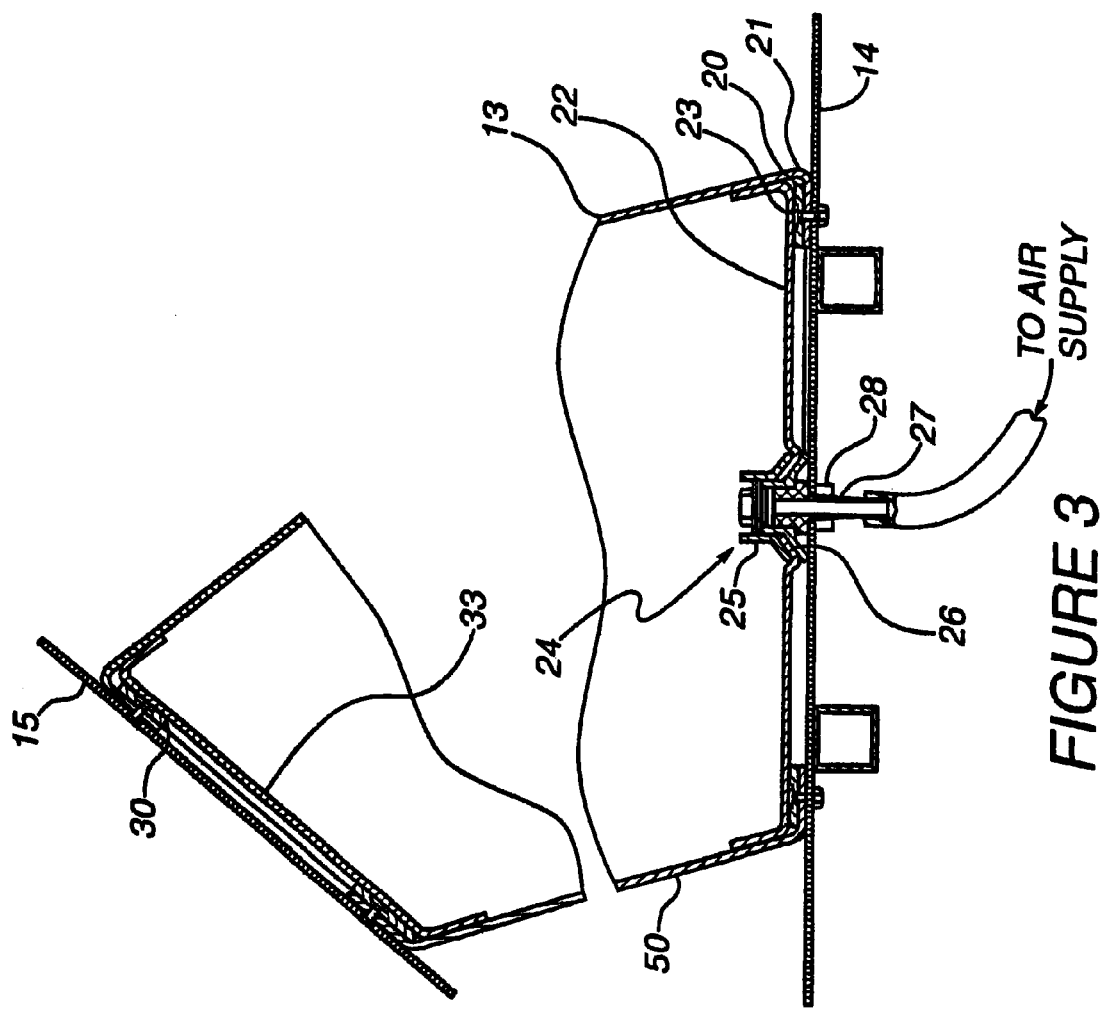
FIG. 3 is a section view taken through the longitudinal axis of the bag of the present invention.
Figure 4:
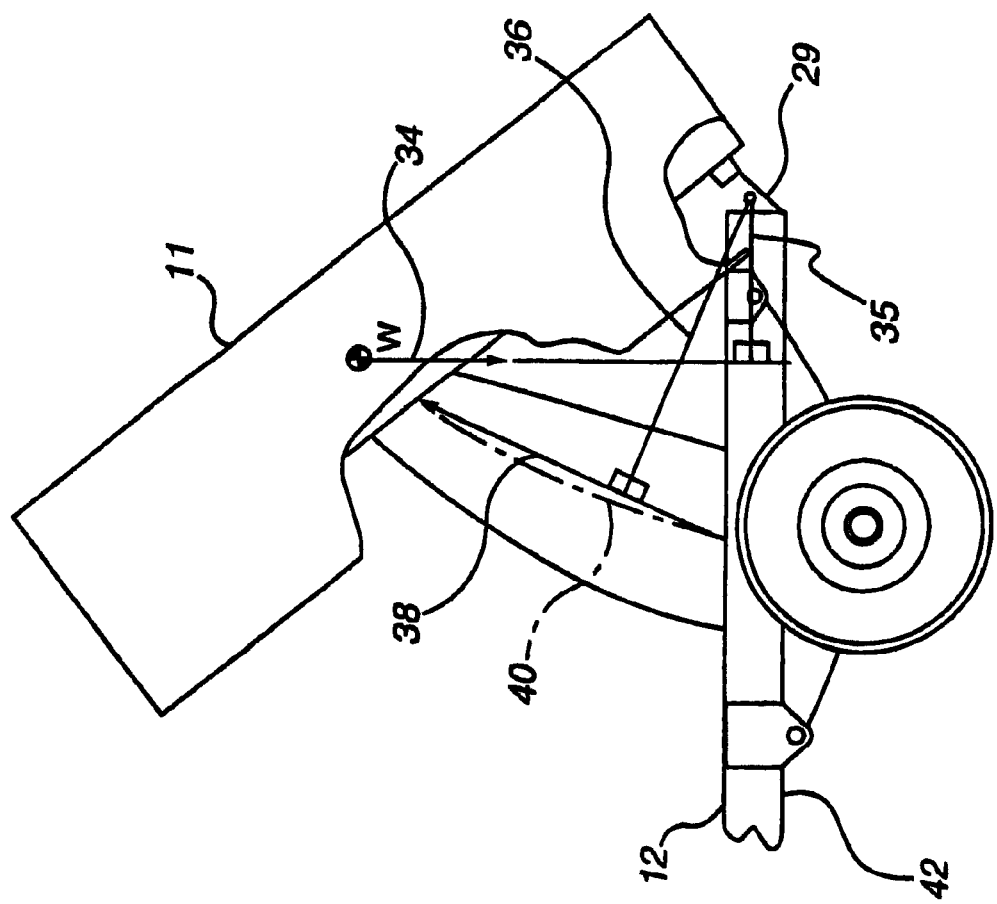
FIG. 4 is a side view of the bag shown in FIG. 1 mounted to a dumping vehicle.

FIG. 3 illustrates the preferred mounting assembly of the bag 13 to the thrust plates 14, 15. The bag 13 is preferably mounted to the lower thrust plate 14 at several mounting points. For reasons discussed below, it is important to firmly secure the end portions of the bag 13 nearest to the hinge 29 (FIGS. 1 and 4). The bag includes a flap 21 that extends down past the bag bottom 22. The flap 21 is preferably a single extension of bag material positioned around the circumference of the bottom of the bag 13, but may also comprise two or more individually spaced apart extensions. A backing plate, preferably a doughnut 20, is then placed against the bottom of the bag 13, and the flap 21 is affixed to the bottom of the doughnut 20. Although preferred, the doughnut 20 need not be in the shape of a ring that extends completely around the bottom of the bag, but, like the flap 21, may comprise one or more segmented portions. The doughnut 20 preferably has apertures therein so that t-nuts 23 are inserted therethrough to firmly sandwich the flap 21 between the doughnut 20 and the bottom thrust plate 14.

The center of the bag 13 is preferably secured to the bottom thrust plate 14 via a flange connection 24 which passes through a central hole in the bag 13 that acts as an entrance for air or other gases into the bag 13. The top flange piece 25 and the bottom flange piece 26 are standard components that preferably engage each other in a threaded relationship so that they clamp the bag bottom 22 therebetween. The flange connection 24 also includes a female thread to attach a male hose attachment 27. The male hose attachment 27 also has an external thread so that it may be secured to the thrust plate 14. The hose attachment 27 extends through the lower thrust plate 14 and a nut 28 holds the hose attachment 27 and thus, the bag 13 to the lower thrust plate 14.

The top 33 of the bag 13 is mounted to the upper thrust plate 15 using an upper doughnut 30 in a manner similar to that described above relating to the lower thrust plate 14. However, the upper thrust plate does not require the use of a flange connection 24. As with the lower thrust plate 14 connection, it is important that the top 33 of the to bag 13 is firmly secured to the top thrust plate 15 nearest to the hinge 29.

Referring to FIG. 4, to optimize folding the bag 13 from an inflated to a deflated position, the centerline 40 of the bag should lie on a radius about the bed hinge 29. As more particularly illustrated in FIGS. 5a–5c, the working surface 55 is the top surface of the bag 13 that, at a given degree of tilt (Ø), rests against the bottom of the load and supports the load weight. As will be discussed, the cross sectional area of the working surface 55 varies relative to the height of lift for the load. To optimize the size of the bag 13, for each degree of tilt, the bag lift moment is set equal to the load moment. The load moment ($M_{load}$) is the load weight ($W_{load}$) 34 multiplied by the distance ($D_{load}$) 35, measured perpendicularly from the hinge 29 to the line of action of the load weight 34 (also called, herein, a vertical line intersecting a centroid of the load); all of these values are known. The bag lift moment ($M_{lift}$) is the smallest bag cross sectional area of the working surface 55 at that degree of tilt multiplied by the bag pressure multiplied by the distance ($D_{lift}$) 36, measured perpendicularly, from the hinge 29 to the line of action 38 of the bag 13, which is the distance from the center of the bag bottom 22 to the center of the bag top 33; the only unknown value being the bag cross sectional area of the working surface 55, which can be determined from the other values.

Having the preferred design as described above, the bag 13 collapses in an arcuate motion of the top thrust plate 15 with respect to the bag shape and the lower thrust plate 14. The top thrust plate 15 follows an arc about the bed pivot. The ideal shape for folding the bag 13 would be a curved or banana-like shape, with a larger area at the bottom 22 than the top 33, and where the centers of each cross section of the bag are on an arc swung around the bed pivot. It is at this point that the bag 13 will start to collapse at its smallest cross sectional area, identified as Section L, and continue to folding downwardly upon itself, collapsing Sections K then J and so forth until the bag 13 is completely collapsed into the footprint of its base (Section A) without buckling. As the bag 13 collapses, the cross sectional area of the working surface 55 increases and is the area of each successive collapsing section.

Figure 5A:
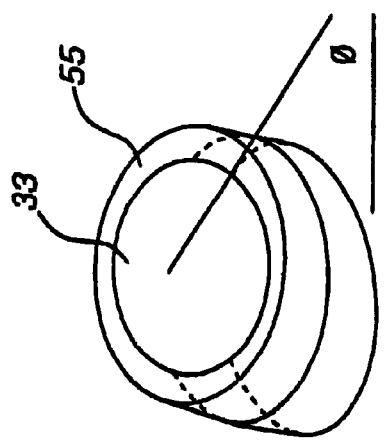
FIG. 5a is perspective view of the inflatable lifting bag of the present invention in a partially inflated lower position showing the working surface and its relation to the tilt angle.
Figure 5B:
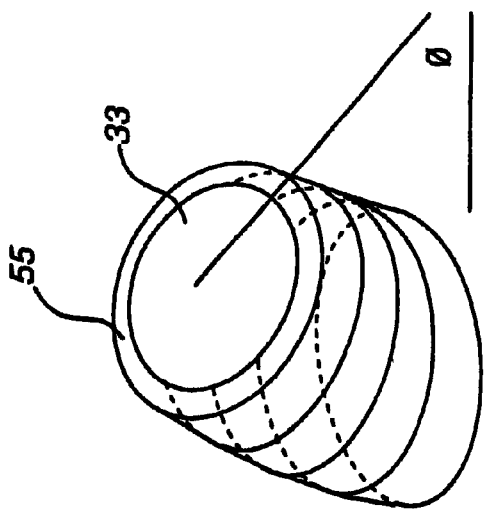
FIG. 5b is perspective view of the inflatable lifting bag of the present invention in a partially inflated middle position showing the working surface and its relation to the tilt angle.
Figure 5C:
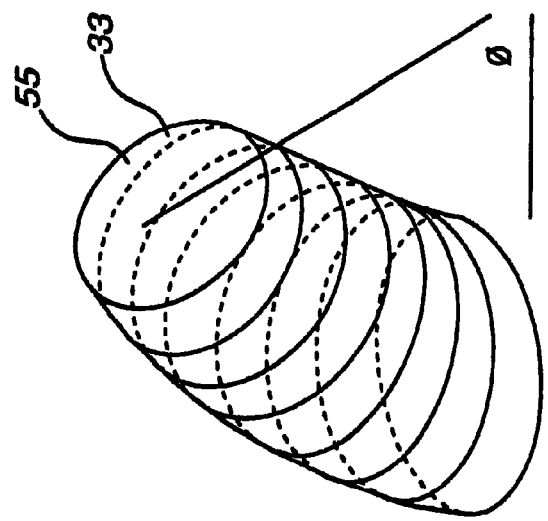
FIG. 5c is perspective view of the inflatable lifting bag of the present invention in a fully inflated position showing the working surface and its relation to the tilt angle.
Figure 6:
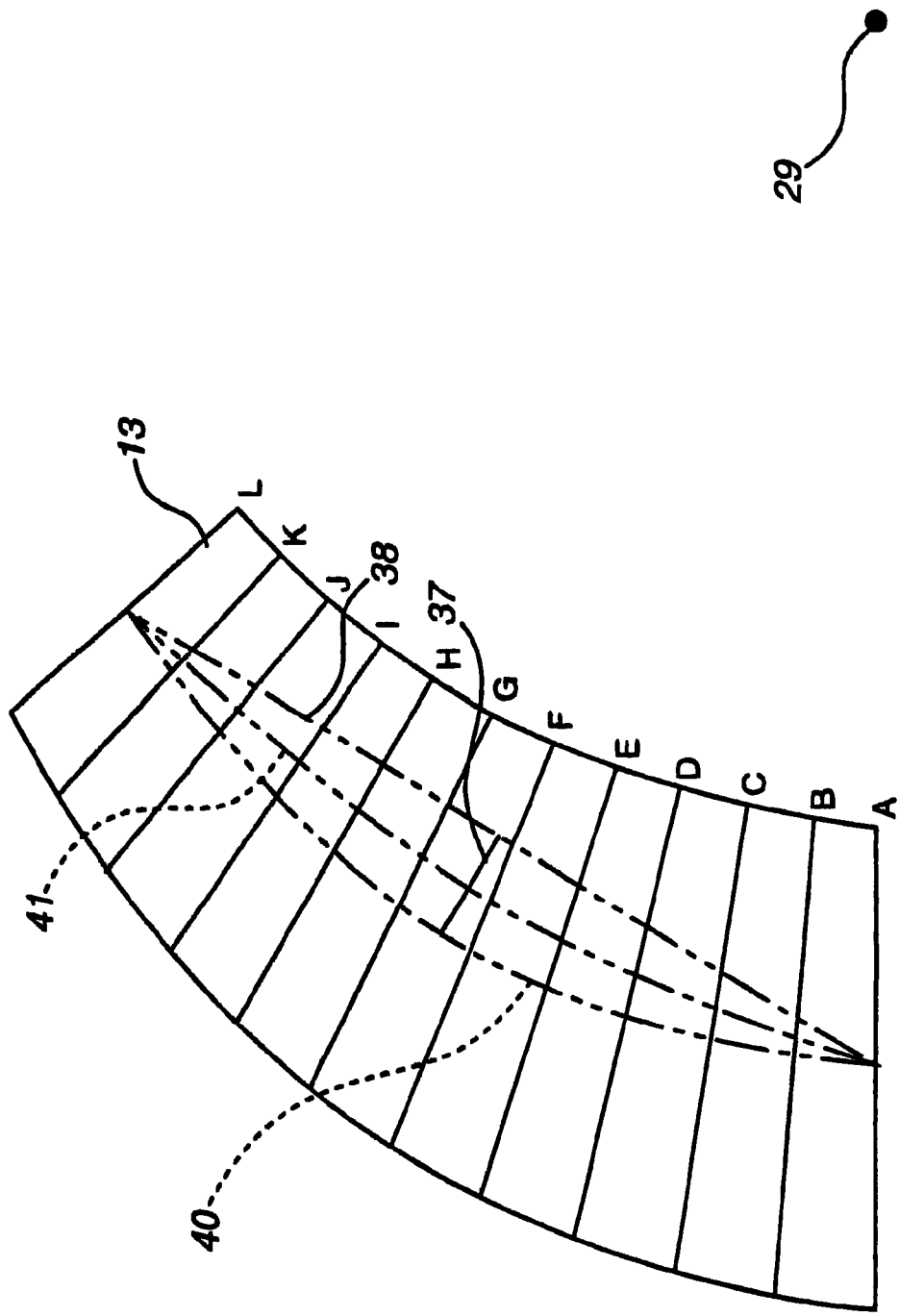
FIG. 6 is a side view of an eccentrically loaded bag of the present invention.

The above-described design performs very well for small angles of tilt. As shown in FIGS. 4 and 5, however, for larger angles of tilt, the eccentricity 37 of the bag column, which is the distance between the line of action 38 and the line connecting the centers of the bag 40 (also referred to, herein, as the original arc), becomes so great that the bag 13 buckles, as shown in phantom lines, before the smallest part of the bag 13 (i.e. the working surface 55, FIGS. 5a–5c) can collapse. This problem is solved in two ways. First, the ends of the bag column are fixedly supported as described above such that the bag bottom 22 and the bag top 33 cannot rotate in the direction of the arrows shown at 39. This is accomplished by holding the bag 13 at points labeled A and B. Second, referring to FIG. 6, to further reduce the buckling effects of the eccentricity 37, the centers of the bag 13 cross sections that lie on the original arc 40 are slid along a radial line from the hinge 29 toward the hinge 29, such that they will lie upon new curve 41. The amount of this movement can be minimized and thus optimized by using finite element analysis to determine when the compressive force on the hinge side of the bag goes to zero for a lift force of the bag 13 equal to the area of the small end of the bag 13 multiplied by the bag pressure. After moving the centers of the sections as described, the areas are adjusted to account for the change in the perpendicular lift distance 36.

Figure 7:
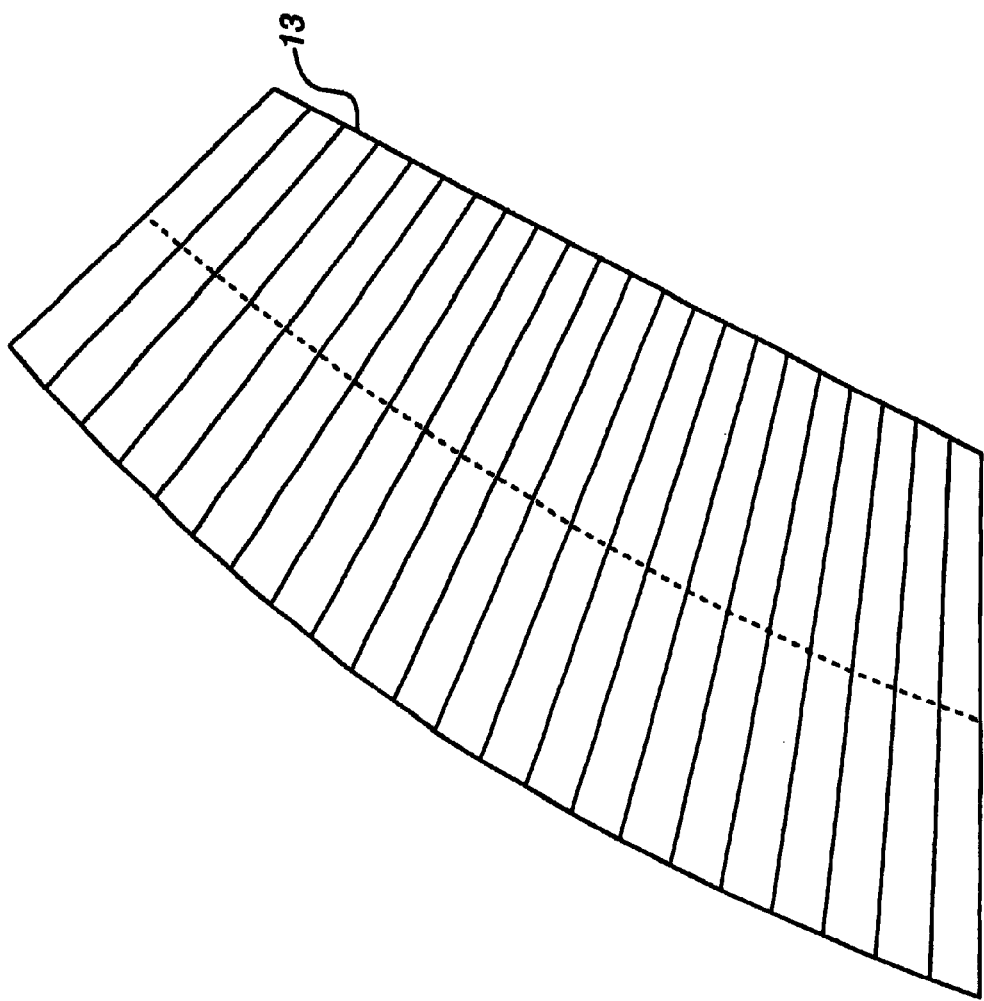
FIG. 7 is a side view of a preferred embodiment of the bag of the present invention.

The bag design described above will allow the rotation of the bed 11 approximately 45° to 50°, and will result in certain of the cross sections nearest the hinge 29 lying nearly in a straight line. The minor adjustments of the cross sections along a radial line from the hinge 29, described above, allow the end sections nearest the hinge 29 to fall on a straight line nearest the hinge 29 as illustrated in FIG. 7. Optimization of cross sections along the radial line from the hinge has the added advantage of allowing the bag 13 to be manufactured with only one vertical seam. Final adjustments to the areas of the different cross sections allow $M_{load}=M_{lift}$. In the preferred embodiment, the shape of the cross section of the bag 13 is elliptical, with the major axis parallel to the chassis frame 42.

By more efficiently using the available energy to inflate the bag 13, the lateral and longitudinal dimensions of the bag 13 can be designed smaller than the prior art thereby reducing cost and allowing the bag components to more easily fit in the limited space available between the truck bed 11 and chassis 12. In addition, cycle times of the inflatable bag 13 can be faster. The present invention has the further advantage allowing the bag 13, excluding the top 33 and bottom 22, to be made out of a single piece of material, thereby requiring fewer seams, which has the advantage of less imperfections where seams are welded, fewer places of stress concentrations, and less bag bulk for better folding.

Figure 8:
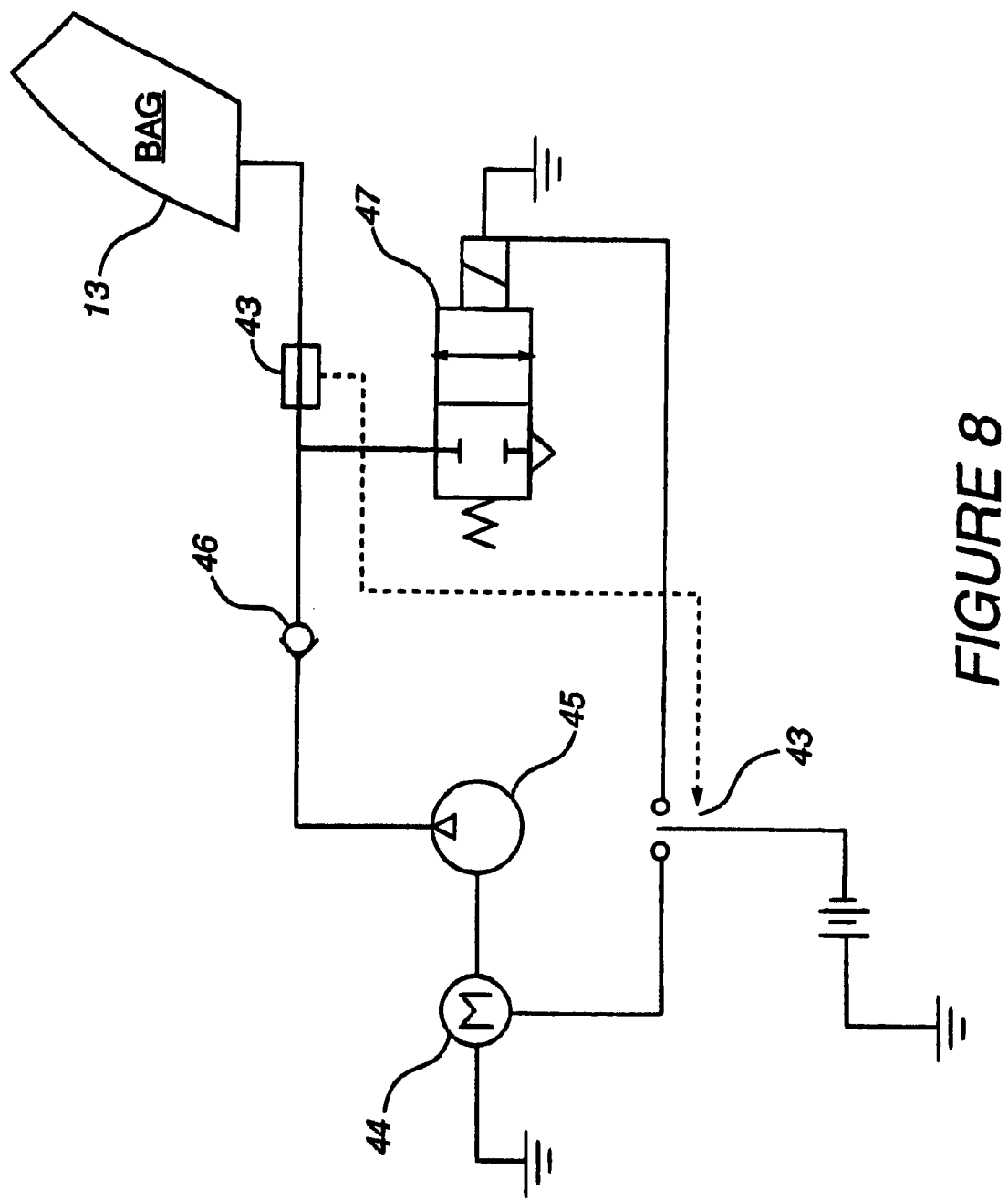
FIG. 8 is a pneumatic circuit schematic for connection to the bag of the present invention.

As illustrated in FIG. 8, there is shown a system whereby the bag 13 may be filled with air from a separate electrically run centrifugal pump 45. Air is pumped through a one way check valve 46 into the bag 13 so that when the pump 45 is turned off, the bag will still retain the gas. A pressure switch 43 is also preferably connected in-line. Should the pressure in the bag 13 increase so that it is higher than the set point of the pressure switch 43, the electrical portion of the switch 43 opens, thereby cutting power to the motor 44. A normally closed solenoid valve 47 is teed off between the check valve 46 and the bag 13. When the operator decides to lower the truck bed, a lower switch is pushed activating the solenoid valve 47 which then opens and allows air to leave the bag 13. If the pump 45 is stopped before the bag 13 reaches full extension, the check valve 46 will stop the reverse flow, and the truck bed will maintain an intermediate position. This pumping method allows the use of higher bag pressures, which thereby allows the bag 13 to be designed with a smaller cross sectional area, which in turn allows the bag 13 to fold into a relatively small volume.

Although the invention has been described in detail in the foregoing for the purpose of illustration, it is to be understood that such detail is solely for that purpose and that variations can be made therein by those of ordinary skill in the art without departing from the spirit and the scope of the invention as defined by the following claims, including all equivalents thereof.

We claim:

1. A system for connecting a lifting bag assembly to a thrust plate, said system comprising:

an inflatable bag comprising:
a first end connected by an intermediate section to a second end, said second end
having a flap attached thereto, said flap extending downwardly therefrom such that
said flap is positioned adjacent said thrust plate;

a backing plate positioned between said second end and said flap; and a fastener passing through said backing plate, said flap and said thrust plate.

2. The system of claim 1 further comprising a flange connecting said bag to a gas supply.

3. The system of claim 1, wherein said backing plate is substantially doughnut shaped.

* * * * *